United States Patent
Clark

(10) Patent No.: US 8,678,665 B2
(45) Date of Patent: Mar. 25, 2014

(54) BEARING ARRANGEMENT FOR HEAVY DUTY MARINE TRANSMISSION

(75) Inventor: Andrew Clark, Vernon Hills, IL (US)

(73) Assignee: Twin Disc., Inc., Racine, WI (US)

( * ) Notice: Subject to any disclaimer, the term of this patent is extended or adjusted under 35 U.S.C. 154(b) by 1024 days.

(21) Appl. No.: 11/683,709

(22) Filed: Mar. 8, 2007

(65) Prior Publication Data

US 2008/0219605 A1 Sep. 11, 2008

(51) Int. Cl.
F16C 19/24 (2006.01)
F16C 19/10 (2006.01)
F16D 11/00 (2006.01)

(52) U.S. Cl.
USPC ...... 384/557; 192/110 B; 74/606 R; 384/605; 384/905

(58) Field of Classification Search
USPC ........ 384/557, 905, 493, 605; 74/361, 606 R; 192/110 B, 112
See application file for complete search history.

(56) References Cited

U.S. PATENT DOCUMENTS

| | | | | |
|---|---|---|---|---|
| 2,019,464 | A * | 10/1935 | Riblet | 74/424 |
| 2,464,538 | A | 3/1949 | Vanderzee | |
| 2,729,981 | A * | 1/1956 | Budzien | 74/361 |
| 2,851,895 | A * | 9/1958 | Aschauer | 74/361 |
| 2,943,719 | A * | 7/1960 | McNamara et al. | 192/3.57 |
| 3,561,829 | A | 2/1971 | Heldt | |
| 3,908,517 | A * | 9/1975 | Wenbourne | 91/497 |
| 4,135,611 | A * | 1/1979 | Spanke | 192/18 A |
| 4,217,766 | A * | 8/1980 | Suckow | 464/180 |
| 4,226,485 | A * | 10/1980 | Pruvot | 384/557 |
| 5,028,152 | A | 7/1991 | Hill et al. | |
| 5,366,299 | A * | 11/1994 | Hughes | 384/571 |
| 5,598,747 | A * | 2/1997 | Schetter et al. | 74/606 R |
| 5,601,169 | A * | 2/1997 | Wodecki | 192/56.33 |
| 6,273,614 | B1 | 8/2001 | Nicot | |
| 6,293,704 | B1 | 9/2001 | Gradu | |
| 7,086,983 | B2 * | 8/2006 | Turner et al. | 475/230 |
| 7,175,350 | B2 * | 2/2007 | Gradu et al. | 384/557 |
| 7,318,759 | B2 | 1/2008 | Bristol et al. | |
| 2001/0046340 | A1 | 11/2001 | Shimomura | |
| 2002/0079179 | A1 | 6/2002 | Hirota et al. | |
| 2005/0207689 | A1 * | 9/2005 | Gradu et al. | 384/557 |
| 2006/0018582 | A1 | 1/2006 | Gradu et al. | |
| 2006/0133709 | A1 | 6/2006 | Nied | |
| 2007/0155578 | A1 | 7/2007 | Petruska et al. | |
| 2007/0287339 | A1 | 12/2007 | Bristol et al. | |

FOREIGN PATENT DOCUMENTS

EP 0230929 8/1987

* cited by examiner

*Primary Examiner* — Alan B Waits
(74) *Attorney, Agent, or Firm* — Boyle Fredrickson, S.C.

(57) ABSTRACT

A bearing arrangement to reduce the effects of thermal expansion in a marine transmission includes a pinion gear thrust bearing, a clutch shaft thrust bearing, a shaft roller bearing and a thrust washer. The clutch shaft thrust bearing is retained on one end of a clutch shaft and the shaft roller bearing is retained on the other end of the clutch shaft. A pinion gear is rotatably retained on the clutch shaft. The pinion gear thrust bearing is retained on the pinion gear with a bearing retainer. The thrust washer is retained on the bearing retainer. An end of the clutch shaft thrust bearing rotates relative to the thrust washer and makes contact therewith. The length of thermal expansion in the transmission housing is limited to the distance between the opposing ends of the two thrust bearings.

14 Claims, 5 Drawing Sheets

US 8,678,665 B2

BEARING ARRANGEMENT FOR HEAVY DUTY MARINE TRANSMISSION

BACKGROUND OF THE INVENTION

1. Field of the Invention

The present invention relates generally to thermal expansion in marine transmissions and more specifically to a bearing arrangement to reduce the effects of thermal expansion in a marine transmission, which locates thrust bearings for a clutch shaft assembly as close as possible to reduce the effects of thermal expansion.

2. Discussion of the Prior Art

It is a common practice to fabricate marine transmission housings out of aluminum castings to reduce the overall weight of a transmission. However, aluminum castings have a different thermal expansion coefficient than steel; elements of clutch shaft assemblies are fabricated from steel. The greater the distance between thrust bearings retaining the clutch shaft assembly, the greater the disparity of thermal expansion lengths between the housing and the clutch shaft. The effect of the disparity between thermal expansion lengths is damage to the marine transmission housing, gears, bearings and other internal components at temperature extremes. It appears that the prior art fails to provide a solution to the problem of thermal expansion in marine transmissions.

Accordingly, there is a clearly felt need in the art for a bearing arrangement to reduce the effects of thermal expansion in marine transmission, which locates thrust bearings for a clutch shaft assembly as close as possible to reduce the effects of thermal expansion between dissimilar materials through the use of a special wear resistant thrust washer.

SUMMARY OF THE INVENTION

The present invention provides a bearing arrangement to reduce the effects of thermal expansion in a marine transmission, which locates opposing thrust bearings on a clutch shaft as close as possible to each other. The bearing arrangement to reduce the effects of thermal expansion in a marine transmission (bearing arrangement) includes a pinion gear thrust bearing, a clutch shaft thrust bearing, a shaft roller bearing and a thrust washer. A clutch shaft assembly includes a clutch shaft, a pinion gear and a clutch assembly. An inner race of the clutch shaft thrust bearing is retained on one end of the clutch shaft and an inner race of a shaft roller bearing is retained on the other end of the clutch shaft. An outer race of the clutch shaft thrust bearing is retained in one end of the transmission housing and an outer race of the shaft roller bearing is retained in the other end of the transmission housing.

The pinion gear may rotate in either direction relative to the clutch shaft, depending on clutch engagement. An inner race of the pinion gear thrust bearing is retained on one end of the pinion gear with a pinion bearing retainer. A pinion gear roller bearing is retained in substantially the other end of the pinion gear, such that the pinion gear rotates relative to the clutch shaft. The thrust washer is retained on the pinion bearing retainer with at least two dowels. The inner race of the clutch shaft thrust bearing physically contacts the thrust washer and rotates relative thereto. The thrust washer is fabricated from a special material that is more resistant to wear than that of the prior art. Prior art thrust washers will wear out, after a short period of time, due to frictional contact with the clutch shaft thrust bearing. The thrust washer (fabricated from the special material) allows close placement of the thrust bearings. The special material has not been available, until just recently. The length of thermal expansion is limited to the distance from the opposite ends of the two thrust bearings.

An output shaft assembly includes an output shaft and an output gear. Inner races of first and second thrust bearings rotate in the same direction and thus are placed in contact with each other without wear occurring and especially to reduce the effects of thermal expansion. The first thrust bearing is retained between a first step in the output shaft, near one end thereof and a bearing retaining cap. The bearing retaining cap is attached to the transmission housing. The second thrust bearing is retained between the first thrust bearing, a tubular spacer and a second step in the output shaft. The shaft roller bearing is retained on substantially the other end of output shaft. The length of thermal expansion is limited to the distance from the opposite ends of the first and second thrust bearings. However, it is well known in the art to place thrust bearings in contact with each other on an output shaft of a transmission.

Accordingly, it is an object of the present invention to provide a bearing arrangement, which locates thrust bearings for a clutch shaft assembly as close as possible to reduce the effects of thermal expansion between dissimilar materials through the use of a special thrust washer.

These and additional objects, advantages, features and benefits of the present invention will become apparent from the following specification.

DETAILED DESCRIPTION OF THE PREFERRED EMBODIMENTS

Figure 1:
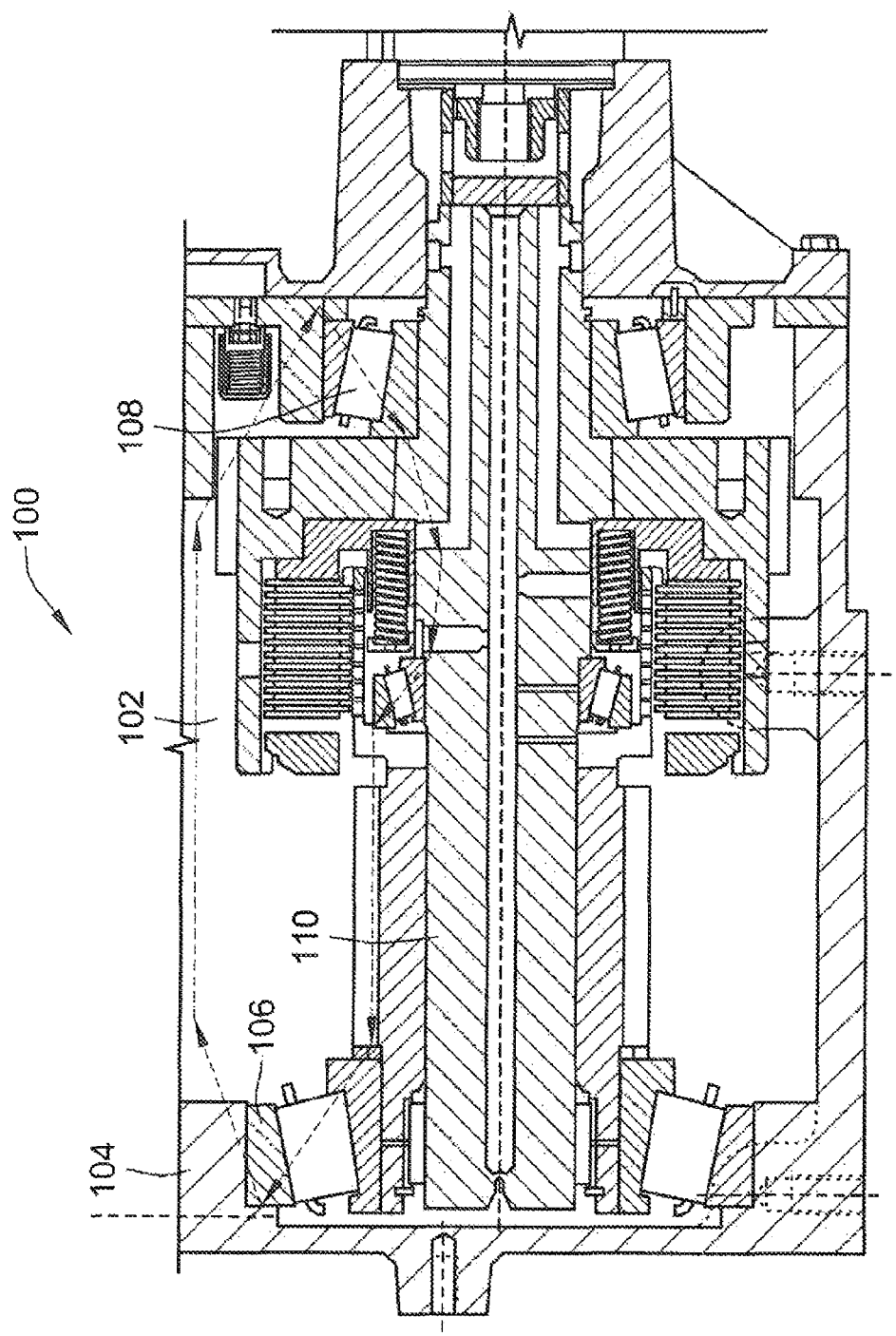
FIG. 1 is a cross-sectional view of a clutch shaft assembly of a prior art marine transmission having a large thermal expansion length or stack-up.

With reference now to the drawings, and particularly to FIG. 1, there is shown a cross-sectional view of a prior art clutch shaft assembly 102 of a marine transmission 100. The length of thermal expansion in the transmission housing 104 is defined from an outer surface of a first thrust bearing 106 to an outer surface of a second thrust bearing 108. The transmission housing 102 is fabricated from an aluminum alloy and a clutch shaft 110 of the clutch shaft assembly 102 is fabricated from steel. Steel and aluminum alloy have different rates of thermal expansion. The difference in thermal expansion rates can result in misalignment of components and/or damage to components in the transmission.

Figure 2:
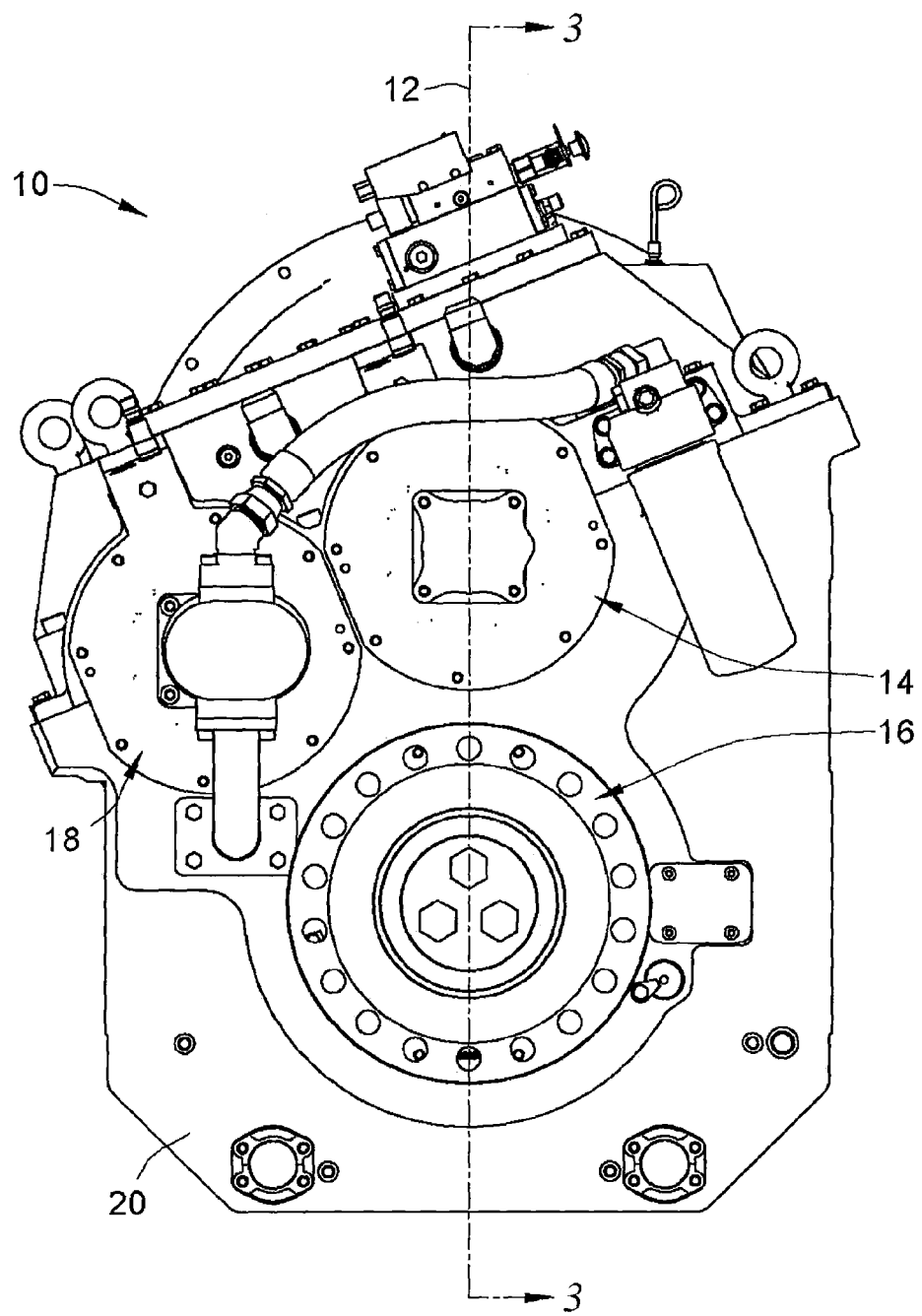
FIG. 2 is an end view of a marine transmission of a bearing arrangement in accordance with the present invention.
Figure 3:
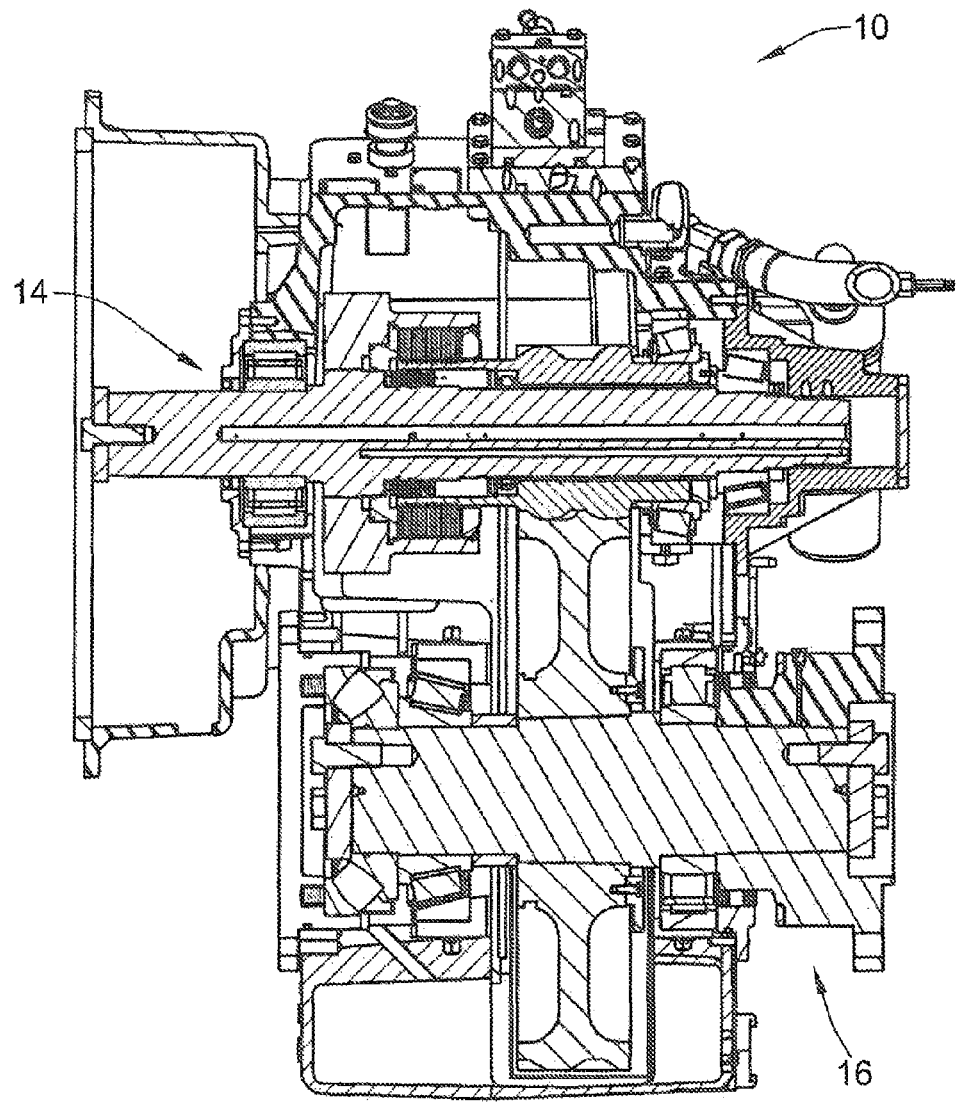
FIG. 3 is a cross-sectional view of a marine transmission of a bearing arrangement in accordance with the present invention.
Figure 4:
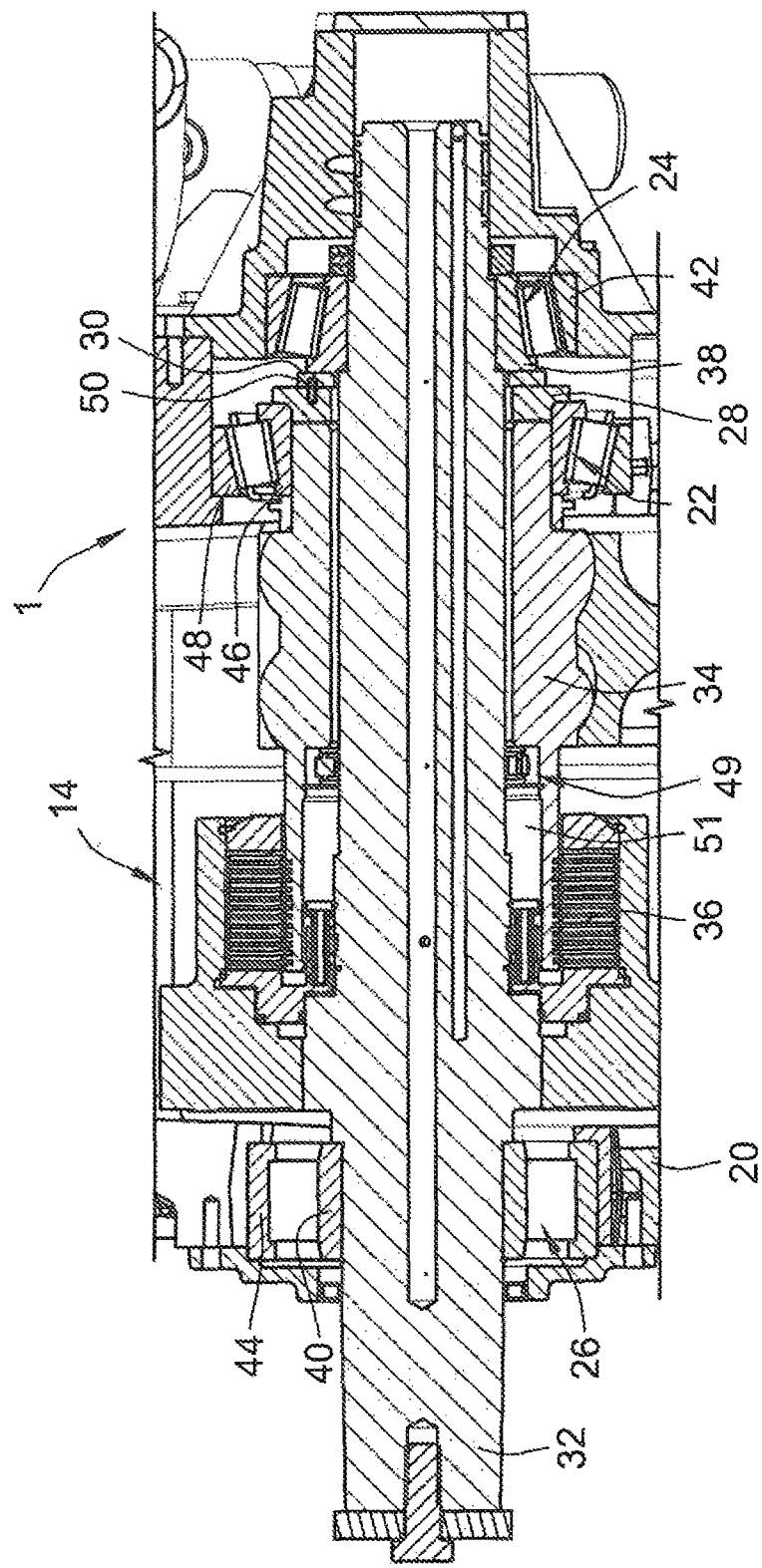
FIG. 4 is an enlarged cross-sectional view of a clutch shaft assembly of a marine transmission having a bearing arrangement in accordance with the present invention.

FIG. 2 discloses an end view of a marine transmission 10. A cutting plane line 12 is drawn through a centerline of a primary clutch shaft assembly 14 and an output shaft assembly 16. The marine transmission 10 also includes a secondary clutch shaft assembly 18 and a transmission housing 20. A cross section of the clutch shaft assembly 14 and the output shaft assembly 16 are illustrated in FIG. 3. With reference to FIG. 4, a bearing arrangement 1 includes a pinion gear thrust bearing 22, a clutch shaft thrust bearing 24, a shaft roller bearing 26 and a thrust washer 30.

The primary clutch shaft assembly 14 includes a clutch shaft 32, a pinion gear 34 and a clutch assembly 36. An inner race 38 of the clutch shaft thrust bearing 24 is retained on one end of the clutch shaft 32 and an inner race 40 of the shaft roller bearing 26 is retained on the other end of the clutch shaft 32. An outer race 42 of the clutch shaft thrust bearing 24 is retained at one end of the transmission housing 20 and an outer race 44 of the shaft roller bearing 26 is retained in the other end of the transmission housing 20. The pinion gear 34 rotates in either direction relative to the clutch shaft 32, depending on clutch engagement. An inner race 46 of the pinion gear thrust bearing 22 is retained on one end of the pinion gear 34 with a pinion bearing retainer 28. An outer race 48 of the pinion gear thrust bearing 22 is retained in the transmission housing 20. The pinion bearing retainer 28 is preferably attached to the one end of the pinion gear 34 with fasteners (not shown) or the like. A pinion gear roller bearing 49 is retained in a pinion bore 51 disposed in substantially the other end of the pinion gear 34, such that the pinion gear 34 rotates relative to the clutch shaft 32.

The thrust washer 30 is retained on the pinion bearing retainer 28 with at least two dowels 50 or the like. The inner race 38 of the clutch shaft thrust bearing 24 physically contacts the thrust washer 30 and frequently rotates in a direction opposite thereto. The thrust washer 30 is fabricated from a special material that is resistant to wear, due to frictional contact from the inner race 38 of the clutch shaft thrust bearing 24. The special material was not available, until recently. The special material must have a pressure-velocity value of at least 100,000 psi-ft/min. A suitable special material is sold, under the trade name of Vespel SP-21. Vespel SP-21 is manufactured by DuPont, Inc. However, the special material should not be limited to Vespel SP-21, but should include any material that has pressure-velocity characteristics of at least 100,00 psi-ft/min. Thrust washers fabricated from even the hardest materials in the past would wear out in a short period of time and fail. The thrust washer 30 (fabricated from the special material) allows close placement of the thrust bearings 22, 24. The length of thermal expansion is limited to the distance from the opposite ends of the two thrust bearings 22, 24.

Figure 5:
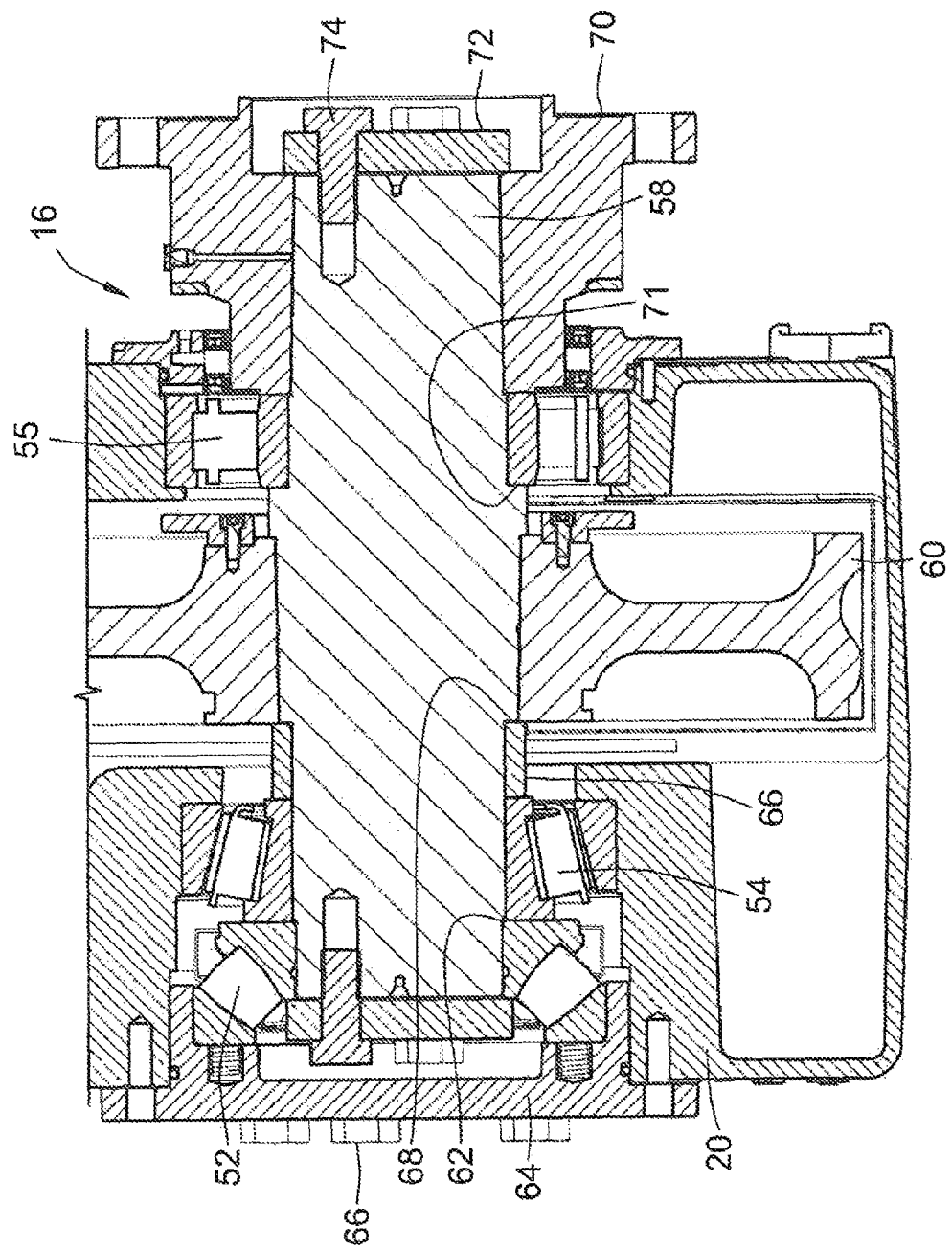
FIG. 5 is an enlarged cross-sectional view of an output shaft assembly of a marine transmission having a bearing arrangement in accordance with the present invention.

With reference to FIG. 5, the output shaft assembly 16 includes an output shaft 58 and an output gear 60. The output gear 60 is driven by the pinion gear 34. Inner races of a first thrust bearing 52 and a second thrust bearing 54 rotate in the same direction and thus are placed in contact with each other without inducing wear. The first thrust bearing 52 is retained between a first step 62 in the output shaft 58, near one end thereof and a bearing retaining cap 64. The bearing retaining cap 64 is attached to the transmission housing 20 with a plurality of fasteners 66.

The second thrust bearing 54 is retained between the first thrust bearing 52, a tubular spacer 66 and a second step 68 in the output shaft 58. A shaft roller bearing 56 is retained between a third step 71 in the output shaft 58 and an output flange 70. The output flange 70 is secured to an end of the output shaft 58 with an end plate 72 and at least two fasteners 74. The length of thermal expansion is limited to the distance from the opposite ends of the first and second thrust bearings. However, it is well known in the art to place thrust bearings in contact with each other on an output shaft of a transmission.

The bearing arrangement 1 should not be limited to clutch shafts for marine transmissions, but should include any shaft application with an object that rotates on the shaft in a direction opposite of the shaft. The object could be a gear, a clutch, a clutch assembly or any other device.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A bearing arrangement of a transmission to reduce the effects of thermal expansion comprising:
    a housing of the transmission made from a first material having a first thermal expansion coefficient;
    a first thrust bearing having an inner race and being retained on substantially one end of a shaft, substantially the other end of said shaft being supported by a roller bearing, wherein the shaft is made from a second material having a second thermal expansion coefficient;
    an object rotating on and with respect to the shaft;
    a second thrust bearing having an inner race and being retained on said object with a bearing retainer that is arranged between the first and second thrust bearings; and
    a thrust washer that engages the bearing retainer, wherein the bearing retainer and thrust washer are sandwiched between the first and second thrust bearings so that the inner race of the one of the first and second thrust bearings engages the bearing retainer and the inner race of the other one of the first and second thrust bearings engages the thrust washer.

2. The bearing arrangement to reduce the effects of thermal expansion of claim 1, further comprising:
    said thrust washer being secured to said bearing retainer with at least two fasteners.

3. The bearing arrangement to reduce the effects of thermal expansion of claim 1, further comprising:
    said object being a gear.

4. The bearing arrangement to reduce the effects of thermal expansion of claim 1. further comprising:
    said shaft rotating in a direction opposite of said object.

5. A bearing arrangement of a transmission to reduce the effects of thermal expansion comprising:
    a housing of the transmission made from a first material having a first thermal expansion coefficient;
    a first thrust bearing having an inner race and being retained on substantially one end of a shaft, substantially the other end of said shaft being supported by a roller bearing, wherein the shaft is made from a second material having a second thermal expansion coefficient;
    an object rotating on and with respect to the shaft;
    a second thrust bearing having an inner race and being retained on the object such that the second thrust bearing is spaced from the shaft; and
    a thrust washer and a bearing retainer engaging each other and arranged so that one of the thrust washer and bearing retainer engages the inner race of the first thrust bearing and the other one of the thrust washer and bearing retainer engages the inner race of the second thrust bearing so that the thrust washer transfers thrust loads between the first thrust bearing and the second thrust bearing so as to limit a length of thermal expansion of the bearing arrangement corresponding to a distance between the first and second thrust bearings despite a disparity of thermal expansion coefficients between the housing and the shaft.

6. The bearing arrangement to reduce the effects of thermal expansion of claim 5, further comprising:
    said thrust washer being secured to the bearing retainer with at least two fasteners.

7. The bearing arrangement to reduce the effects of thermal expansion of claim 5, wherein
    the thrust washer and the bearing retainer are concentrically mounted on the shaft, the inner race of one of the first and second thrust bearings is concentrically mounted on the shaft, and the inner race of the other one of the first and second thrust bearings is concentrically mounted on a pinion gear that defines the object rotating on and with respect to the shaft.

8. The bearing arrangement to reduce the effects of thermal expansion of claim 5, further comprising:
    said shaft rotating in a direction opposite of said object.

9. The bearing arrangement to reduce the effects of thermal expansion of claim 5, further comprising:
    said object being a gear.

10. The bearing arrangement to reduce the effects of thermal expansion of claim 5, further comprising:
    said thrust washer being in contact with said first thrust bearing.

11. A bearing arrangement of a transmission to reduce the effects of thermal expansion comprising:
    a housing of the transmission made from a first material having a first thermal expansion coefficient;
    a first thrust bearing having an inner race and being retained on substantially one end of a shaft, substantially the other end of said shaft being supported by a roller bearing, wherein the shaft is made from a second material having a second thermal expansion coefficient;
    a gear rotating on and with respect to the shaft;
    a second thrust bearing having an inner race and being retained on and radially over at least part of the gear; and
    a thrust washer and a bearing retainer engaging each other and arranged so that one of the thrust washer and bearing retainer engages the inner race of the first thrust bearing and the other one of the thrust washer and bearing retainer engages the inner race of the second thrust bearing so that the thrust washer transfers thrust loads between the first and second thrust bearings so as to limit a length of thermal expansion of the bearing arrangement corresponding to a distance between the first and second thrust bearings despite a disparity of thermal expansion coefficients between the housing and the shaft.

12. The bearing arrangement to reduce the effects of thermal expansion of claim 11, further comprising:
    said thrust washer being secured to the bearing retainer on the shaft with at least two fasteners.

13. The bearing arrangement to reduce the effects of thermal expansion of claim 11, further comprising:
    said thrust washer being secured to the bearing retainer, said bearing retainer being secured to an end of the gear.

14. The bearing arrangement to reduce the effects of thermal expansion of claim 11, further comprising:
    said shaft rotating in a direction opposite of said gear.

* * * * *